United States Patent
Alakuijala et al.

(10) Patent No.: US 11,463,733 B2
(45) Date of Patent: Oct. 4, 2022

(54) IMAGE COMPRESSION AND DECOMPRESSION USING CONTROLLED QUALITY LOSS

(71) Applicant: Google LLC, Mountain View, CA (US)

(72) Inventors: Jyrki Alakuijala, Wollerau (CH); Robert Obryk, Zurich (CH); Evgenii Kliuchnikov, Thalwil (CH); Zoltan Szabadka, Wollerau (CH); Jan Wassenberg, Zürich (CH); Minttu Alakuijala, London (CH); Lode Vandevenne, Rüschlikon (CH)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 16/970,499

(22) PCT Filed: Feb. 15, 2019

(86) PCT No.: PCT/US2019/018352
§ 371 (c)(1),
(2) Date: Aug. 17, 2020

(87) PCT Pub. No.: WO2019/161303
PCT Pub. Date: Aug. 22, 2019

(65) Prior Publication Data
US 2021/0084339 A1    Mar. 18, 2021

Related U.S. Application Data

(60) Provisional application No. 62/631,725, filed on Feb. 17, 2018.

(51) Int. Cl.
*H04N 19/65* (2014.01)
*H04N 19/124* (2014.01)
(Continued)

(52) U.S. Cl.
CPC ........... *H04N 19/65* (2014.11); *H04N 19/124* (2014.11); *H04N 19/18* (2014.11); *H04N 19/184* (2014.11); *H04N 19/85* (2014.11)

(58) Field of Classification Search
CPC .. H04N 19/124; H04N 19/154; H04N 19/162; H04N 19/176; H04N 19/18;
(Continued)

(56) References Cited

U.S. PATENT DOCUMENTS

2006/0008167 A1* 1/2006 Yu .................. H04N 1/33307
382/250
2012/0201476 A1* 8/2012 Carmel .................. H04N 19/50
382/239

(Continued)

OTHER PUBLICATIONS

Gao et al; "Image Quality Assessment and Human Visual System"; Visual Communications and Image Processing; Jul. 11, 2010; pp. 1-10.
(Continued)

*Primary Examiner* — Mohammed S Rahaman
(74) *Attorney, Agent, or Firm* — Young Basile Hanlon & MacFarlane, P.C.

(57) ABSTRACT

The loss of image quality during compression is controlled using a sequence of quality control metrics. The sequence of quality control metrics is selected for quantizing transform coefficients within an area of the image based on an error level definition. Candidate bit costs are then determined by quantizing the transform coefficients according to the error level definition or a modified error level and the sequence of quality control metrics. Where the candidate bit cost resulting from using the modified error level is lower than the candidate bit cost resulting from using the error level definition, the transform coefficients are quantized according to the modified error level and the sequence of quality control metrics. Otherwise, the transform coefficients are quantized based on the error level definition and according to the sequence of quality control metrics.

20 Claims, 6 Drawing Sheets

(51) Int. Cl.
*H04N 19/18* (2014.01)
*H04N 19/184* (2014.01)
*H04N 19/85* (2014.01)

(58) Field of Classification Search
CPC ...... H04N 19/184; H04N 19/60; H04N 19/65; H04N 19/85
See application file for complete search history.

(56) References Cited

U.S. PATENT DOCUMENTS

| | | |
|---|---|---|
| 2016/0234496 A1 | 8/2016 | Panda et al. |
| 2017/0070745 A1* | 3/2017 | Lee .................. H04N 19/13 |
| 2017/0150149 A1* | 5/2017 | Carmel ............... H04N 19/176 |

OTHER PUBLICATIONS

Feiyan et al: "Blind Quality Metric for Multidistortation Images Based on Cartoon and Texture Decomposition" IEEE Signal Processing Letters, IEEE Service Center, vol. 23 No. 9; Sep. 1, 2016; pp. 1265-1269.

Sargar et al; "Macroblock level QP Adaptation Using SSIM for H.264 Encoder"; International Journal of Advanced Research in Computer Engineering and Technology; vol. 3, Issue 5; May 2014; pp. 1904-1907.

International Search Report and Written Opinion in PCT/US2019/018352, dated Jul. 9, 2019, 19 pgs.

Zhang et al., "Blind Quality Metric for Multidistortion Images Based on Cartoon and Texture Decomposition"; IEEE Signal Processing Letters, vol. 23, No. 9, Sep. 2016; pp. 1265-1269.

\* cited by examiner

IMAGE COMPRESSION AND DECOMPRESSION USING CONTROLLED QUALITY LOSS

CROSS REFERENCE TO RELATED APPLICATION(S)

This disclosure claims the benefit of U.S. Provisional Application No. 62/631,725, filed Feb. 17, 2018, the disclosure of which is herein incorporated by reference in its entirety.

BACKGROUND

Image content represents a significant amount of online content. A web page may include multiple images, and a large portion of the time and resources spent rendering the web page are dedicated to rendering those images for display. The amount of time and resources required to receive and render an image for display depends in part on the manner in which the image is compressed. As such, an image, and therefore a web page that includes the image, can be rendered faster by reducing the total data size of the image using compression and decompression techniques.

SUMMARY

A method for compressing an image according to an implementation of this disclosure includes receiving an error level definition representing a maximum quantization error for compressing the image and identifying transform coefficients to quantize within an area of the image. A sequence of quality control metrics for controlling a quantization of the transform coefficients is selected based on the error level definition. A first candidate bit cost is determined by quantizing a first copy of the transform coefficients according to the error level definition and the sequence of quality control metrics. A second candidate bit cost is determined by quantizing a second copy of the transform coefficients according to a modified error level and the sequence of quality control metrics. A determination is made as to whether the second candidate bit cost is lower than the first candidate bit cost. Responsive to determining that the second candidate bit cost is lower than the first candidate bit cost, the transform coefficients are iteratively processed according to the modified error level and the sequence of quality control metrics to produce quantized transform coefficients. A compressed image is produced based on the quantized transform coefficients.

In some implementations of the method, iteratively processing the transform coefficients according to the modified error level and the sequence of quality control metrics to produce the quantized transform coefficients includes quantizing the transform coefficients using a first quality control metric of the sequence of quality control metric. Quantizing the transform coefficients using the first quality control metric results in a quantization error. A determination is made that the quantization error exceeds a quality score calibration associated with the first quality control metric. Responsive to determining that the quantization error exceeds the quality score calibration, the transform coefficients are further quantizing using a second quality control metric of the sequence of quality control metrics.

In some implementations of the method, the area of the image is a first area and the sequence of quality control metrics is a first sequence of quality control metrics, and the method further comprises iteratively processing transform coefficients of a second area of the image using a second sequence of quality control metrics.

In some implementations of the method, the modified error level is a first modified error level and iteratively processing the transform coefficients of the second area of the image using the second sequence of quality control metrics includes determining a candidate bit cost by quantizing the transform coefficients of the second area of the image according to a second modified error level and the second sequence of quality control metrics.

In some implementations of the method, selecting the sequence of quality control metrics for controlling the quantization of the transform coefficients includes querying a lookup table based on the error level definition.

In some implementations of the method, the lookup table includes records associated with multiple quality control metrics and selecting the sequence of quality control metrics for controlling the quantization of the transform coefficients includes determining that a subset of the multiple quality control metrics is associated with error levels exceeding the error level definition, and excluding one or more quality control metrics of the subset of the multiple quality control metrics from the sequence of quality control metrics.

In some implementations of the method, responsive to determining that the second bit cost is not lower than the first bit cost, the transform coefficients are iteratively processed according to the error level definition and the sequence of quality control metrics to produce the quantized transform coefficients.

In some implementations of the method, a quantization error represented by the modified error level is larger than the maximum quantization error.

An apparatus for compressing an image according to an implementation of this disclosure includes a processor and a memory. The processor is configured to execute instructions stored in the memory to receive an error level definition representing a maximum quantization error for compressing the image, select a sequence of quality control metrics for controlling a quantization of transform coefficients of the image based on the error level definition, compress the image according to the error level definition and the sequence of quality control metrics, and output the compressed image for storage or display. The instructions to compress the image according to the error level definition and the sequence of quality control metrics include instructions to quantize the transform coefficients using a first quality control metric of the sequence of quality control metrics. A determination is made that a quantization error resulting from quantizing the transform coefficients using the first quality control metric exceeds a quality score calibration associated with the first quality control metric. Responsive to that determination that the quantization error exceeds the quality score calibration, the transform coefficients are further quantized using a second quality control metric of the sequence of quality control metrics to produce quantized transform coefficients. The compressed image is produced based on the quantized transform coefficients.

In some implementations of the apparatus, the instructions include instructions to determine a first candidate bit cost by quantizing a first copy of the transform coefficients according to the error level definition and the sequence of quality control metrics, and determine a second candidate bit cost by quantizing a second copy of the transform coefficients according to a modified error level and the sequence of quality control metrics. A determination is then made, based on the first candidate bit and the second candidate bit cost, to compress the image according to one of the error level definition or the modified error level.

In some implementations of the apparatus, the instructions to determine to compress the image according to one of the error level definition or the modified error level include instructions to determine whether the second candidate bit cost is lower than the first candidate bit cost, and the instructions include instructions to: responsive to a determination that the second candidate bit cost is lower than the first candidate bit cost, compress the image according to the modified error level and the sequence of quality control metrics; and, responsive to a determination that the second candidate bit cost is not lower than the first candidate bit cost, compress the image according to the error level definition and the sequence of quality control metrics.

In some implementations of the apparatus, the quantized transform coefficients are first quantized transform coefficients and the quantization error is a first quantization error, the modified error level corresponds to an area of the image, and the instructions to compress the image according to the modified error level and the sequence of quality control metrics include instructions to quantize a subset of the transform coefficients using the first quality control metric of the sequence of quality control metrics. The subset of the transform coefficients is located within an area of the image. A determination is made that a second quantization error resulting from quantizing the subset of the transform coefficients using the first quality control metric exceeds the quality score calibration associated with the first quality control metric. Responsive to the determination that the second quantization error exceeds the quality score calibration, the transform coefficients are further quantized using the second quality control metric of the sequence of quality control metrics to produce second quantized transform coefficients. A compressed image is produced based on the second quantized transform coefficients.

In some implementations of the apparatus, a quantization error represented by the modified error level is larger than the maximum quantization error.

In some implementations of the apparatus, the modified error level is a first modified error level, the second copy of the transform coefficients corresponds to a first subset of the transform coefficients located within a first area of the image, and the instructions include instructions to determine a third candidate bit cost by quantizing a second subset of the transform coefficients located within a second area of the image according to a second modified error level and the sequence of quality control metrics. The instructions to compress the image according to the error level definition and the sequence of quality control metrics include instructions to compress the first subset of the transform coefficients according to the first modified error level, and compress the second subset of the transform coefficients according to the second modified error level.

In some implementations of the apparatus, the instructions to select the sequence of quality control metrics for controlling the quantization of the transform coefficients of the image include instructions to determine that a subset of quality control metrics available for compressing the image is associated with error levels exceeding the error level definition, and exclude one or more quality control metrics of the subset of the quality control metrics from the sequence of quality control metrics.

A non-transitory computer-readable storage medium according to an implementation of this disclosure includes processor-executable routines that, when executed by a processor, facilitate a performance of operations for compressing an image. The operations include selecting a sequence of quality control metrics for controlling a quantization of transform coefficients of the image. The operations further include iteratively processing a first subset of the transform coefficients located within a first area of the image according to an error level definition and the sequence of quality control metrics to produce first quantized transform coefficients. The operations further include iteratively processing a second subset of the transform coefficients located within a second area of the image according to a modified error level and the sequence of quality control metrics to produce second quantized transform coefficients. The operations further include producing a compressed image based on the first quantized transform coefficients and the second quantized transform coefficients.

In some implementations of the non-transitory computer-readable storage medium, the sequence of quality control metrics defines an order for applying one or more quality control metrics to iteratively quantize some or all of the transform coefficients of the image.

In some implementations of the non-transitory computer-readable storage medium, the error level definition represents a maximum error level for compressing the image and the operations for selecting the sequence of quality control metrics for controlling the quantization of the transform coefficients of the image comprise determining that a subset of quality control metrics available for compressing the image is associated with error levels exceeding the error level definition, and excluding one or more quality control metrics of the subset of the quality control metrics from the sequence of quality control metrics.

In some implementations of the non-transitory computer-readable storage medium, the operations for iteratively processing the first subset of the transform coefficients located within the first area of the image according to the error level definition and the sequence of quality control metrics to produce the first quantized transform coefficients comprise quantizing the first subset of the transform coefficients using a first quality control metric of the sequence of quality control metrics. Quantizing the first subset of the transform coefficients using the first quality control metric results in a quantization error. A determination is made that the quantization error exceeds a quality score calibration associated with the first quality control metric. Responsive to determining that the quantization error exceeds the quality score calibration, the first subset of the transform coefficients is further quantized using a second quality control metric of the sequence of quality control metrics.

In some implementations of the non-transitory computer-readable storage medium, the operations for iteratively processing the first subset of the transform coefficients located within the first area of the image according to the error level definition and the sequence of quality control metrics to produce the first quantized transform coefficients comprise iteratively processing the second subset of the transform coefficients located within the second area of the image according to the error level definition and the sequence of quality control metrics to produce third quantized transform coefficients. A determination is made as to whether a bit cost for the second quantized transform coefficients is lower than a bit cost for the third quantized coefficients. Responsive to determining that the bit cost for the second quantized transform coefficients is not lower than the bit cost for the third quantized coefficients, the third quantized coefficients are used to produce the compressed image instead of the second quantized coefficients.

It will be appreciated that features described above in relation to one implementation may be combined with features of another implementation.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
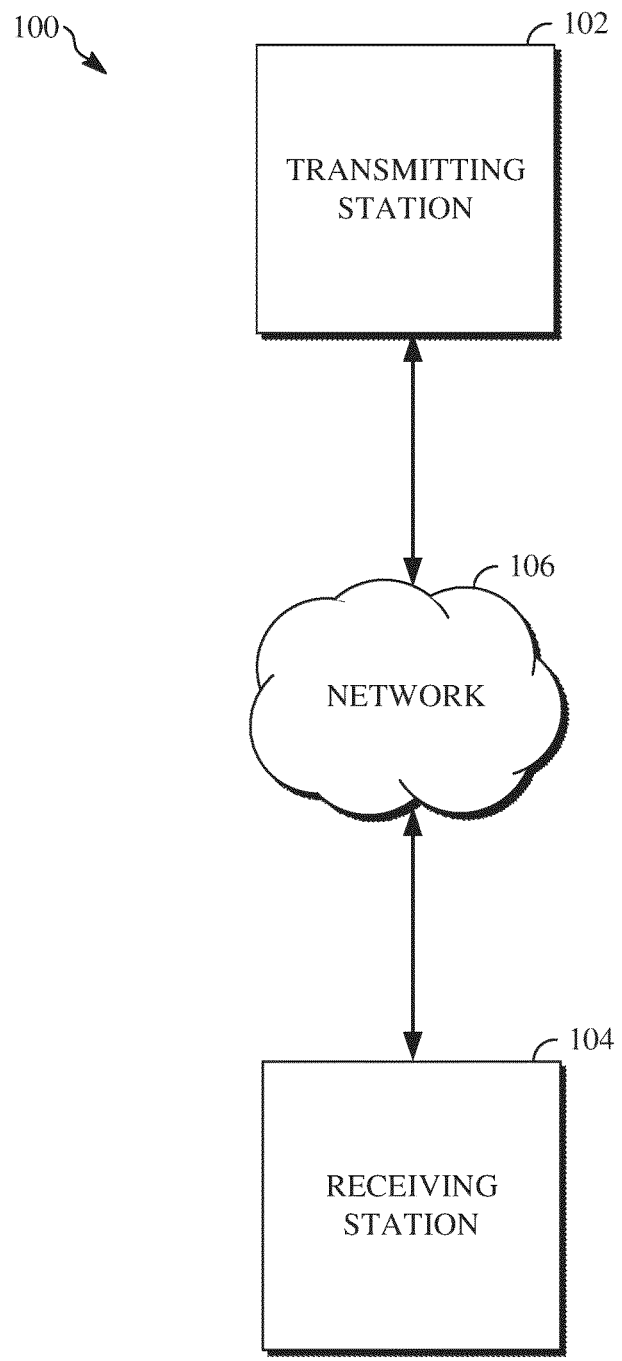
FIG. 1 is a diagram of an image compression and decompression system.

Lossy image compression involves reducing the amount of data within an image to compress, such as using quantization. In exchange for a decreased bit cost of the resulting compressed image, the image suffers certain quality loss. The extent of the quality loss depends largely upon the manner by which the image data was quantized during compression. A certain quantization strategy may work well at a certain scope but not at others. For example, the JPEG compression format allows for relatively efficient coding of high quality images, but can produce undesirable artifacts when its quantization strategy is used on lower quality images.

A typical image compression format derives a quantization strategy for controlling image quality loss for an entire image. The quantization strategy is derived using a metric for evaluating the quality loss, examples of which include peak signal-to-noise ratio (PSNR), human visual system (HVS), a combination of PSNR and HVS (PSNRHVS), and a masked version of that combination (PSNRHVS-M). These metrics are designed to linearly measure image quality for a given point along a quality loss curve. As such, the image quality loss evaluated using one of these metrics is extrapolated across the entire image. Thus, even where quality loss is evaluated using multiple models, the same models are applied against the entire image. However, because different areas of an image include different image content, the use of a linear image quality measurement is suboptimal.

Furthermore, the quantization strategy derived by a typical image compression format is not limited to a particular quantization error. The quantization error resulting from lossy image compression corresponds to the amount of artifacts resulting from the compression. As such, the greater the quantization error, the greater the amount of artifacts, and, therefore, the greater the quality loss. However, it may be desirable to limit lossy image compression to a particular quantization error value, such as to control the quality of the image that will later be decompressed and output for display.

Implementations of this disclosure address problems such as these by controlling the loss of image quality during compression using a sequence of models, or quality control metrics. The sequence of quality control metrics is selected for quantizing transform coefficients within a local area of the image according to an error level definition representing a maximum quantization error to result from compressing the transform coefficients. The transform coefficients are iteratively processed according to the error level definition and the sequence of quality control metrics to produce quantized transform coefficients.

In some cases, candidate bit costs can be determined by quantizing the transform coefficients according to the error level definition and the sequence of quality control metrics or according to a modified error level and the sequence of quality control metrics. Where the candidate bit cost resulting from using the modified error level is lower than the candidate bit cost resulting from using the error level definition, the transform coefficients are quantized according to the modified error level and the sequence of quality control metrics. Otherwise, the transform coefficients are quantized according to the error level definition and the sequence of quality control metrics.

The implementations of this disclosure describe a holistic formalism that allows for image quality degradation along a least disruptive path. Sequences of quality control metrics are applied to transform coefficients within the image to measure the image loss. Based on that measured image loss, the compression of the image can follow a non-linear curve where bit cost and quality loss are both minimized.

Further details of techniques for image compression and decompression using controlled quality loss are described herein with initial reference to a system in which such techniques can be implemented. FIG. 1 is a diagram of an image compression and decompression system 100. The image compression and decompression system 100 includes a transmitting station 102, a receiving station 104, and a network 106.

The transmitting station 102 is a computing device that compresses and transmits an image. Alternatively, the transmitting station 102 may include two or more distributed devices for compressing and transmitting an image. The receiving station 104 is a computing device that receives and decompresses a compressed image. Alternatively, the receiving station 104 may include two or more distributed devices for receiving and decompressing a compressed image. An example of a computing device used to implement one or both of the transmitting station 102 or the receiving station 104 is described below with respect to FIG. 2.

The network 106 connects the transmitting station 102 and the receiving station 104 for the compression, transmission, receipt, and decompression of an image. The network 106 can be, for example, the Internet. The network 106 can also be a local area network (LAN), a wide area network (WAN), a virtual private network (VPN), a cellular telephone network, or another means of transferring the image from the transmitting station 102 to the receiving station 104.

Implementations of the compression and decompression system 100 may differ from what is shown and described with respect to FIG. 1. In some implementations, the compression and decompression system 100 can omit the network 106. In some implementations, an image can be compressed and then stored for transmission at a later time to the receiving station 104 or another device having memory. In some implementations, the receiving station 104 can receive (e.g., via the network 106, a computer bus, and/or some communication pathway) the compressed image and store the compressed image for later decompression.

In some implementations, the functionality of the transmitting station 102 and of the receiving station 104 can change based on the particular operations performed. For example, during operations for compressing an image, the transmitting station 102 can be a computing device used to upload an image for compression to a server, and the receiving station 104 can be the server that receives the image from the transmitting station 102 and compresses the image for later use (e.g., in rendering a webpage). In another example, during operations for decompressing a compressed image, the transmitting station 102 can be a server that decompresses the compressed image, and the receiving station 104 can be a computing device that receives the decompressed image from the transmitting station 102 and renders the decompressed image (e.g., as part of a webpage).

Figure 2:
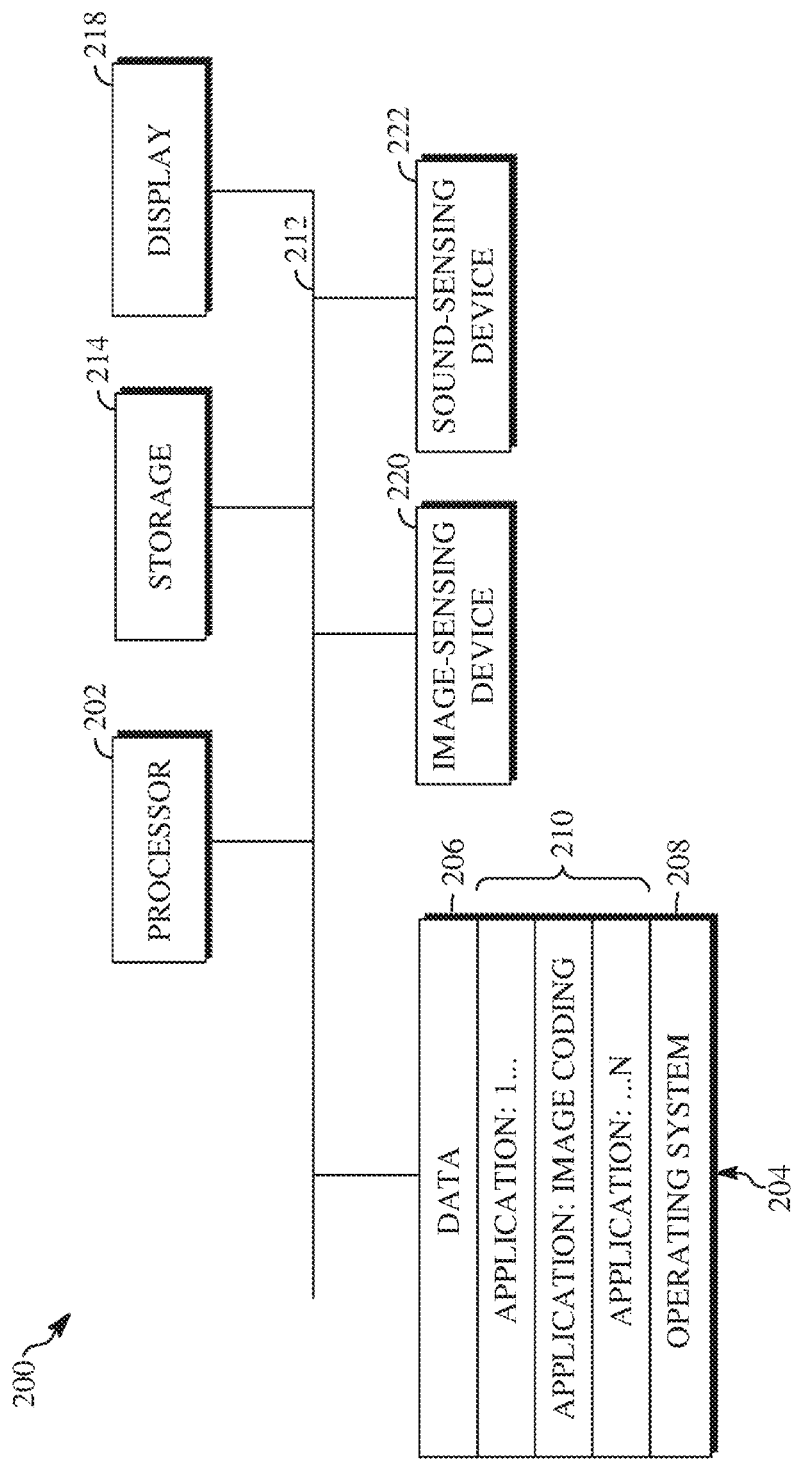
FIG. 2 is an example of an internal configuration of a computing device that can be used in an image compression and decompression system.

FIG. 2 is an example of an internal configuration of a computing device 200 that can be used in an image compression and decompression system, for example, the image compression and decompression system 100 shown in FIG. 1. The computing device 200 may, for example, implement one or both of the transmitting station 102 or the receiving station 104. The computing device 200 can be in the form of a computing system including multiple computing devices, or in the form of one computing device, for example, a mobile phone, a tablet computer, a laptop computer, a notebook computer, a desktop computer, or the like.

A processor 202 in the computing device 200 can be a conventional central processing unit. Alternatively, the processor 202 can be another type of device, or multiple devices, now existing or hereafter developed, capable of manipulating or processing information. For example, although the disclosed implementations can be practiced with one processor as shown (e.g., the processor 202), advantages in speed and efficiency can be achieved by using more than one processor.

A memory 204 in the computing device 200 can be a read-only memory (ROM) device or a random-access memory (RAM) device in an implementation. However, other suitable types of storage devices can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include image compression and/or decompression software that performs some or all of the techniques described herein. The computing device 200 can also include a secondary storage 214, which can, for example, be a memory card used with a mobile computing device. For example, an image can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or another image-sensing device, now existing or hereafter developed, which can sense an image such as the image of a user operating the computing device 200. The image-sensing device 220 can be positioned such that it is directed toward the user operating the computing device 200. For example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or another sound-sensing device, now existing or hereafter developed, which can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Implementations of the computing device 200 may differ from what is shown and described with respect to FIG. 2. In some implementations, the operations of the processor 202 can be distributed across multiple machines (wherein individual machines can have one or more processors) that can be coupled directly or across a local area or other network. In some implementations, the memory 204 can be distributed across multiple machines, such as a network-based memory or memory in multiple machines performing the operations of the computing device 200. In some implementations, the bus 212 of the computing device 200 can be composed of multiple buses. In some implementations, the secondary storage 214 can be directly coupled to the other components of the computing device 200 or can be accessed via a network and can comprise an integrated unit, such as a memory card, or multiple units, such as multiple memory cards.

Figure 3:
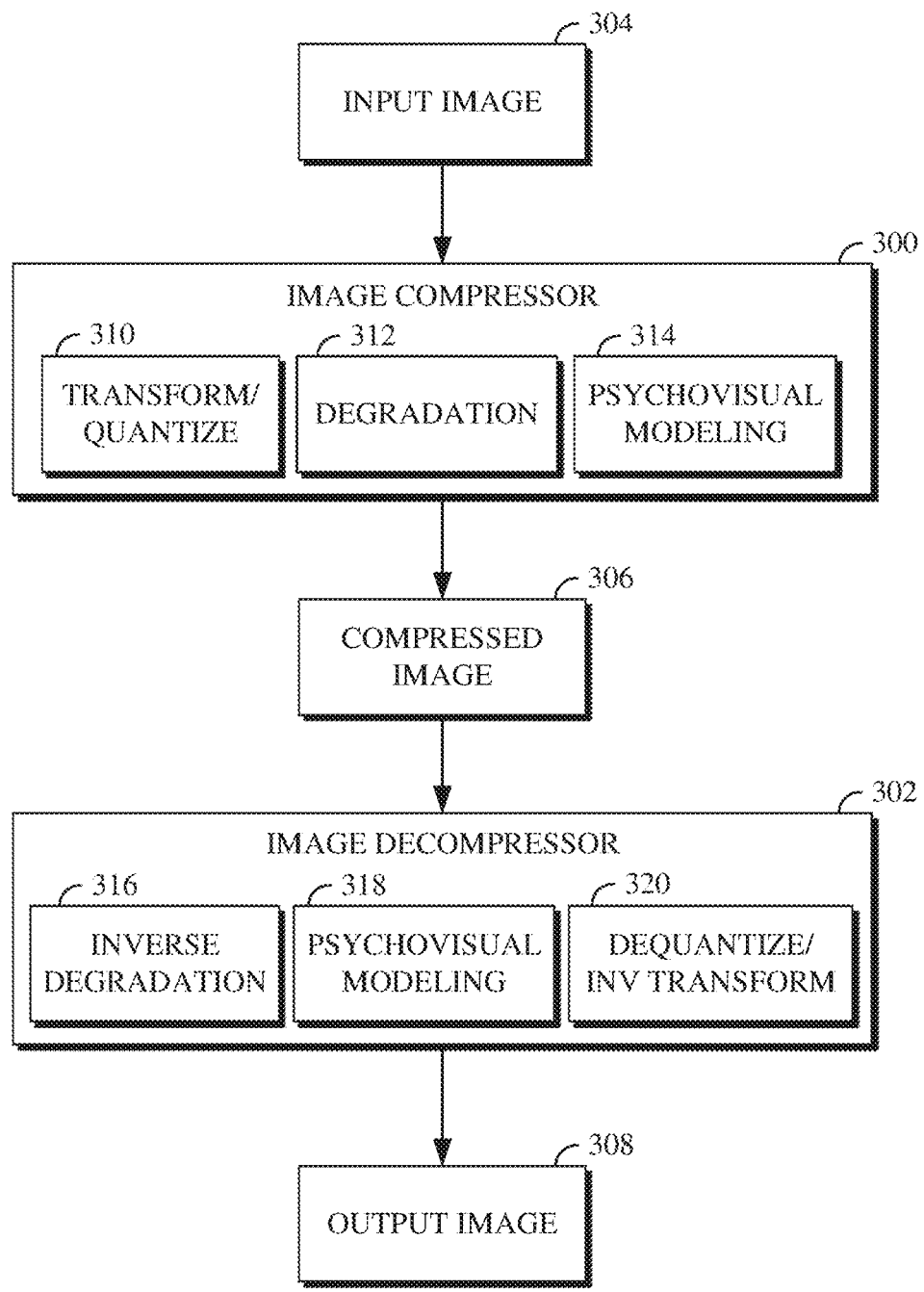
FIG. 3 is a block diagram of an example of an image compressor and an image decompressor.

FIG. 3 is a block diagram of an example of an image compressor 300 and an image decompressor 302. The image compressor 300 and the image decompressor 302 may, for example, respectively be implemented using the transmitting station 102 and the receiving station 104 shown in FIG. 1. The image compressor 300 compresses an input image 304 to produce a compressed image 306. The image decompressor 302 receives and decompresses the compressed image 306 to produce an output image 308 that is perceptibly the same as or similar to the input image 304.

The image compressor 300 includes a transformation and quantization mechanism 310, a degradation mechanism 312, and a psychovisual modeling mechanism 314. The transformation and quantization mechanism 310 transforms blocks of the input image 304 into the frequency domain and quantizes the resulting transform coefficients. For example, the transformation and quantization mechanism 310 can use a discrete cosine transform (DCT) to transform the blocks of the input image 304 from the spatial domain to the frequency domain. Alternatively, the transformation and quantization mechanism 310 can use another Fourier-related transform or a discrete Fourier transform to transform the blocks of the input image 304 from the spatial domain to the frequency domain.

As will be discussed below, the psychovisual modeling mechanism 314 and the degradation mechanism 312 are used to determine how to reduce the amount of data in the input image 304 during compression. The transformation and quantization mechanism 310 quantizes the transform coefficients according to the determinations made using the psychovisual modeling mechanism 314 and the degradation mechanism 312.

The degradation mechanism 312 makes decisions for quantizing areas of the input image 304 using quality control metrics. In particular, the degradation mechanism 312 makes different quantization decisions for different areas of the input image 304. The use of these different quantization decisions allows for the compression of the input image 304 to follow a non-linear quality loss curve (e.g., as opposed to a linear quality loss curve used when a single quantization decision is made for the entirety of the input image 304). That is, although the quality loss for a given area of the image may be expressed linearly, the overall quality loss for the image as a whole is expressed non-linearly.

An area of an image refers to an M×N-sized region of the image, where M and N may be the same or a different value. For example, an area of an image may be a single block (e.g., an 8×8 block) within the image. In another example, an area of an image may be multiple blocks within the image. In yet another example, different areas of an image to compress may be different sized blocks (e.g., some 8×8, some 4×4, some 16×16, etc.).

A quality control metric refers to a model for evaluating the quality of an image after certain image content is reduced, removed, or otherwise modified. A quality control metric evaluates the quality of the image by determining a quality score for the quantization applied to the image. The quantized transform coefficients can be reconstructed to produce a decompressed image. The quality control metric uses a parameterized model to compare that decompressed image to the original image (e.g., the input image 304). The results of the comparison reflect the degree to which the quantization resulted in perceptible quality loss to the image. The quality score provides a valuation for the results of the comparison. Each of the quality control metrics may use the same or different parameters to model the quality loss between the decompressed image and the original image.

The quality control metrics are applied in a particular sequence to optimize a reduction in the amount of data in the input image 304 according to an error level defined for use with the image compressor 300. Applying a quality control metric refers to measuring the quality loss by quantizing transform coefficients of the image in a certain way. There may be many quality control metrics available for processing the input image 304. The sequence of quality control metrics defines an order for applying one or more quality control metrics to iteratively quantize some or all of the transform coefficients within the input image 304 (e.g., within the entire input image 304 or within an area of the input image 304).

Examples of the quality control metrics may include, without limitation, a pristine image quality control metric, a phase loss in high-information-density textures quality control metric, a structural similarity (SSIM) quality control metric, a cartoon image quality control metric, a color-loss quality control metric, a viewing distance loss quality control metric, a fewer pixels per bit quality control metric, a film grain and/or digital noise preservation quality control metric, a chromatic aberration quality control metric, and a texture cluster quality control metric.

With the pristine quality control metric, a reproduction cannot be distinguished from an original even in an in-place flip test. Such a measurement consists of a phase-coherent representation of image textures, ridge and edge detection, visual masking, least mean squares (LMS) color modeling, and other modeling.

Visual masking allows for different areas of an image to be stored at different accuracies (e.g., up to six times a quantization difference). This is because the darker areas of a visual mask require less precise reproduction of details. There may be one or more masking models used by the pristine quality control metric. For example, a first masking model can be used for low spatial frequency color modeling, and a second masking model can be used for high spatial frequency color modeling. The first masking model and the second masking model may be applied individually or in combination.

With the phase loss in high-information-density textures quality control metric, the image is compressed as a cartoon (e.g., using the Gaussian mixture model) based on the image textures. Textures with dense information content are compressed in log Gabor space, in which frequencies are clustered and phase is randomized. For example, an image of a brick house may use large amounts of information to represent the exact location of each brick. In such a case, since the exact location of each brick is not essential information to a human viewer, the image can be compressed as a structure without a brick in every position. Bricks can then be modeled as textures within the compressed structure to create the appearance of a brick house without spending bits to specify the locations of the bricks. The same principle can be applied in other contexts, for example, using textures to represent sand on a beach.

With the SSIM quality control metric, SSIM is used to preserve high-information-density textures through their approximate noise levels. The noise levels are reconstructed from a noise synthesis process to reproduce matching averages and variances. SSIM creates the same amount of noise and etched visuals in a reconstructed image as there was in the original image. However, the system may not always identify accurate noise representations. For example, if there is a thin line in the original image, using SSIM may result in a different object with a similar variance.

With the cartoon image quality control metric, material information about the image disappears, but edges and average colors are preserved, such that the image looks median filtered. Fine details of textures (e.g., of tree leaves, stones, cloth, skin, hair) are lost and may instead have a plastic-like look as a result of this transform.

With the color-loss quality control metric, color information is lost in a way that balances the kind of color and the spatial resolution of the feature represented in that color. The loss is similar to a YUV420 loss, but is performed in a proper color space to avoid visible artifacts. High-frequency blue-yellow axis colors may be removed first, followed by high-frequency green-red axis colors. Use of this quality control metric may result in a flat appearance.

With the viewing distance loss quality control metric, the increasing loss needed for lower bit rates is considered as something that matches with a person moving farther away from the image. The resulting differences are barely noticeable and used for the coding. For example, a psychovisual modeling (e.g., of the psychovisual modeling mechanism 314 shown in FIG. 3) used to compress an image may typically compare original and reconstructed images at a distance of 1,000 pixels. However, further quality loss may be observed when the distance is changed (e.g., from 1,000 pixels to 2,000 pixels).

With the fewer pixels per bit quality control metric, fewer pixels instead of fewer bits per pixel also results in fewer bytes to transfer. When the use of fewer pixels results in better image quality, it indicates how and when to choose to use fewer pixels when a user requests extreme loss. In this way, the resulting image can have better overall quality, even at a lower resolution.

With the film grain and/or digital noise preservation quality control metric, grainy or noisy areas of an image are preserved. These areas can be preserved by using a consistent quantization across the coefficients thereof.

With the chromatic aberration quality control metric, chromatic aberrations and other similar spatial correlations are removed from the image. Often in images, there is a shift of red and green color data from each other. For example, when there is an object against a black background in the image, it may be perceived to have a slight red glare on one side and a slight green glare on the other side. Such glares require bits for storing. Removing chromatic aberrations such as these glares (e.g., by calculating the shift for the red signal to match with the green signal) results in a lower bit cost.

With the texture cluster quality control metric, textures and rotationally invariant models of textures can be compressed as clusters in the Fast-Fourier transform (FFT) space. This quality control metric may be particularly effective for images where cartoon and texture models have already been separated.

The degradation mechanism 312 can degrade the input image 304 according to an error level definition representing a maximum quantization error to result from compressing the input image 304. For example, the maximum quantization error may refer to a number or amount of visual artifacts resulting from compressing the input image 304. The error level definition may reflect a default value, be configured according to input received by a user of the image compressor 300, or be determined based on characteristics of the input image 304 (e.g., using results of pre-processing performed against the input image 304 to determine a resolution or file size thereof).

Each of the quality control metrics may be associated with an error level or a range of error levels. In such a case, only the quality control metrics associated with the error level definition defined for compressing an image will be considered for selection. Data associated with the quality control metrics can be stored in a lookup table (LUT). The LUT can be queried based on the error level definition. The results of the query can thus include the quality control metrics that are available for compressing the image according to the error level definition.

The degradation mechanism 312 includes functionality for bit budgeting compression of the input image 304 based on the error level definition. The degradation mechanism 312 identifies a number of bits saved by reducing the data of the input image 304 according to a quality control metric using the error level definition. However, the degradation mechanism 312 can also identify a number of bits saved by reducing the data of the input image 304 according to a quality control metric using a quantization error value other than the error level definition. This bit budgeting technique is locally performed at areas of the input image 304, rather than globally for the entire input image 304.

Bit budgeting for image degradation can include producing a globally quantized image by quantizing all transform coefficients in image according to the error level definition. Separately, transform coefficients located in different areas of the image can be quantized at different error levels. The number of bits saved by quantizing a given area of the image at a different error level (hereafter, a modified error level) is compared to the number of bits saved by quantizing the corresponding area in the globally quantized image. In the event that the number of bits saved by quantizing at the modified error level is greater than the number of bits saved by quantizing at the error level definition, the modified error level is used for compressing the subject area of the image. Otherwise, the error level definition is used for compressing the subject area of the image.

For example, the error level definition may be set to 1.3. Using a given quality control metric at error level 1.3, the degradation mechanism 312 may quantize transform coefficients within an area of the input image 304 to result in a bit savings of 0.5 bits. However, using the same quality control metric, but at a modified error level of 1.4, the degradation mechanism 312 may determine that quantizing those same transform coefficients results in a bit savings of 7 bits. Given the increase in bit savings, the degradation mechanism 312 uses the error level 1.4 to degrade that area of the input image 304.

The psychovisual modeling mechanism 314 uses a perceptual distance metric to guide compression optimization. The psychovisual modeling mechanism 314 includes software rules for processing an input image 304 based on the perceptible qualities of the input image 304. The software rules of the psychovisual modeling mechanism 314 focus on three properties of vision: first, that gamma correction should not be separately applied to every red-green-blue (RGB) channel; second, that high frequency changes in blue color data can be less precisely compressed; and third, that areas including larger amounts of visual noise within an image can be less precisely compressed.

The first property of vision is driven by the overlap of sensitivity spectra of the cones of the human eye. For example, because there is some relationship between the amount of yellow light seen and sensitivity to blue light, changes in blue color data in the vicinity of yellow color data can be compressed less precisely. luma-chrominance (YUV) color spaces are defined as linear transformations of gamma-compressed RGB and are therefore not powerful enough to model such phenomena.

The second property of vision is driven by the color receptors of the retina of the human eye. In particular, the human eye has lower spatial resolution in blue than in red and green, and the retina has almost no blue receptors in the high-resolution area.

The third property of vision is defined based on a relationship between visibility and proximal visual activity. That is, the visibility of fine structures in an area of an image may depend on the amount of visual activity in the vicinity of that area.

Although the software rules of the psychovisual modeling mechanism 314 are described with reference to three properties of vision, other numbers of properties of vision, other rules related to image compression or image perceptibility, or a combination thereof may be used to define or otherwise configure the software rules of the psychovisual modeling mechanism 314.

The degradation mechanism 312 is used in conjunction with the psychovisual modeling mechanism 314 to reduce the total data size of the input image 304 without impacting the perceived visual quality of the input image 304, subject to the error level definition. For example, the degradation mechanism 312 can be processed in connection with a threshold defined using the psychovisual modeling mechanism 314. The threshold can represent a maximum acceptable perceptual distance for color data of the input image 304 and a compressed image produced using the degradation mechanism 312. Alternatively, the threshold can represent a range of acceptable perceptual distances for such color data.

Furthermore, the particular types of data reduction may be non-linear. For example, in some cases, high frequency blue color data can be entirely removed since it is not perceivable by receptors of the fovea. However, the red and green receptors of the fovea may perceive blue color data when red and green color data is not present. As such, a quality control metric may reflect that high frequency blue color data can be reduced or removed when values of red and green color data are high (e.g., when they meet a threshold value), but not when the value of red color data and/or the value of green color data is/are lower (e.g., when they do not meet the threshold value).

The compressed image 306 may be stored at a server (e.g., in a database or like data store) for later retrieval and decompression. For example, the compressed image 306 may be an image hosted on a website or an image provided for display on a webpage. The image decompressor 302 retrieves the compressed image 306 from storage or memory and decompresses it to produce the output image 308. In that the compression of the input image 304 is lossy, the output image 308 may look substantially the same as, but not necessarily be identical to, the input image 304.

The image decompressor 302 includes an inverse degradation mechanism 316, a psychovisual modeling mechanism 318, and a dequantization and inverse transformation mechanism 320. The inverse degradation mechanism 316 uses information associated with the compressed image 306 to determine a sequence of quality control metrics that were used to produce the compressed image 306. For example, metadata included in or otherwise associated with the compressed image 306 can reflect the quality control metrics used to iteratively degrade image content from the input image 304 during compression, as well as the sequence thereof.

The psychovisual modeling mechanism 318 is used to determine that image quality added back into the compressed image 306 using the inverse degradation mechanism 316 is consistent with rules for visual perception of an image. For example, the psychovisual modeling mechanism 318 may use the same rules as the psychovisual modeling mechanism 314; however, the psychovisual modeling mechanism 318 is used to determine that image content added back into the compressed image 306 is perceptible by a human viewer.

The dequantization and inverse transformation mechanism 320 dequantizes the coefficients of the compressed image 306 according to a quantization factor used to produce the compressed image 306 (e.g., the error level definition or a modified error level). The dequantization and inverse transformation mechanism 320 then inverse transforms the dequantized coefficients, such as by transforming the dequantized coefficients from the frequency domain to the spatial domain. The dequantization and inverse transformation mechanism 320 processes the compressed image 306 before the inverse degradation mechanism 316 and the psychovisual modeling mechanism 318 are used.

Implementations of the image compressor 300 and/or the image decompressor 302 may differ from what is shown and described with respect to FIG. 3. In some implementations, the image decompressor 302 may omit the psychovisual modeling mechanism 318. For example, the inverse degradation mechanism 316 of the image decompressor 302 can use quality control metrics to identify the particular quality control metrics and sequence of operations applied at the image compressor 300 to degrade the input image 304 for compression into the compressed image 306. Alternatively, the psychovisual modeling mechanism 318 can be replaced with a sequence identification mechanism for identifying the sequence of operations and quality control metrics applied at the image compressor 300.

In some implementations, one or both of the image compressor 300 or the image decompressor 302 may include additional software mechanisms for respectively compressing or decompressing an image. For example, in addition to the transformation and quantization mechanism 310, the image compressor 300 may include an image prediction mechanism, an entropy coding mechanism, an image reconstruction mechanism, or the like, or a combination thereof. Alternatively, such additional mechanisms can be combined into the transformation and quantization mechanism 310 rather than being implemented as a separate software mechanism. Similarly, the image decompressor 302 may include an image prediction mechanism, an entropy coding mechanism, an image reconstruction mechanism, or the like, or a combination thereof, either combined into the dequantization and inverse transformation mechanism 320 or as separate software mechanisms.

In some implementations, particular quality control metrics may not be selected for processing an area of an image. For example, a quality control metric that, when processed against an image, results in quality loss by transmitting fewer pixels during compression and then performing an upsampling during decompression is applied at the image-level rather than at the block-level. In another example, a quality control metric used for noise preservation may result in strange artifacts when processed at the block-level, but perform as desired when processed at the image-level.

In some implementations, the image compressor 300 can receive input representing a maximum total file size of the compressed image 306 to produce. The maximum total file size can be used to make decisions in regard to the error level to use to compress particular areas of the input image 304. For example, if there are few bits remaining before the maximum total file size is reached, an area of the input image 304 that has not yet been processed may be compressed using a modified error level that is higher than the error level definition defined for the input image 304. In doing so, that area can be compressed using fewer bits, even though the quality will be reduced slightly. This bit cost reduction will allow the image compressor 300 to remain within the maximum total file size.

In some implementations, the image compressor 300 may use the transformation and quantization mechanism 310, the degradation mechanism 312, and the psychovisual modeling mechanism 314 to generate and evaluate candidate compressed images using different sequences of quality control metrics applied to different areas of the input image 304. In such a case, the image compressor 300 can thereafter process the generated candidate compressed images and select one of them. For example, the generated candidate compressed image having a lowest total data size can be selected. The sequence of quality control metrics applied to the areas of the input image 304 to produce the selected candidate compressed image are then used to compress the input image 304, such as to produce the compressed image 306.

Figure 4:
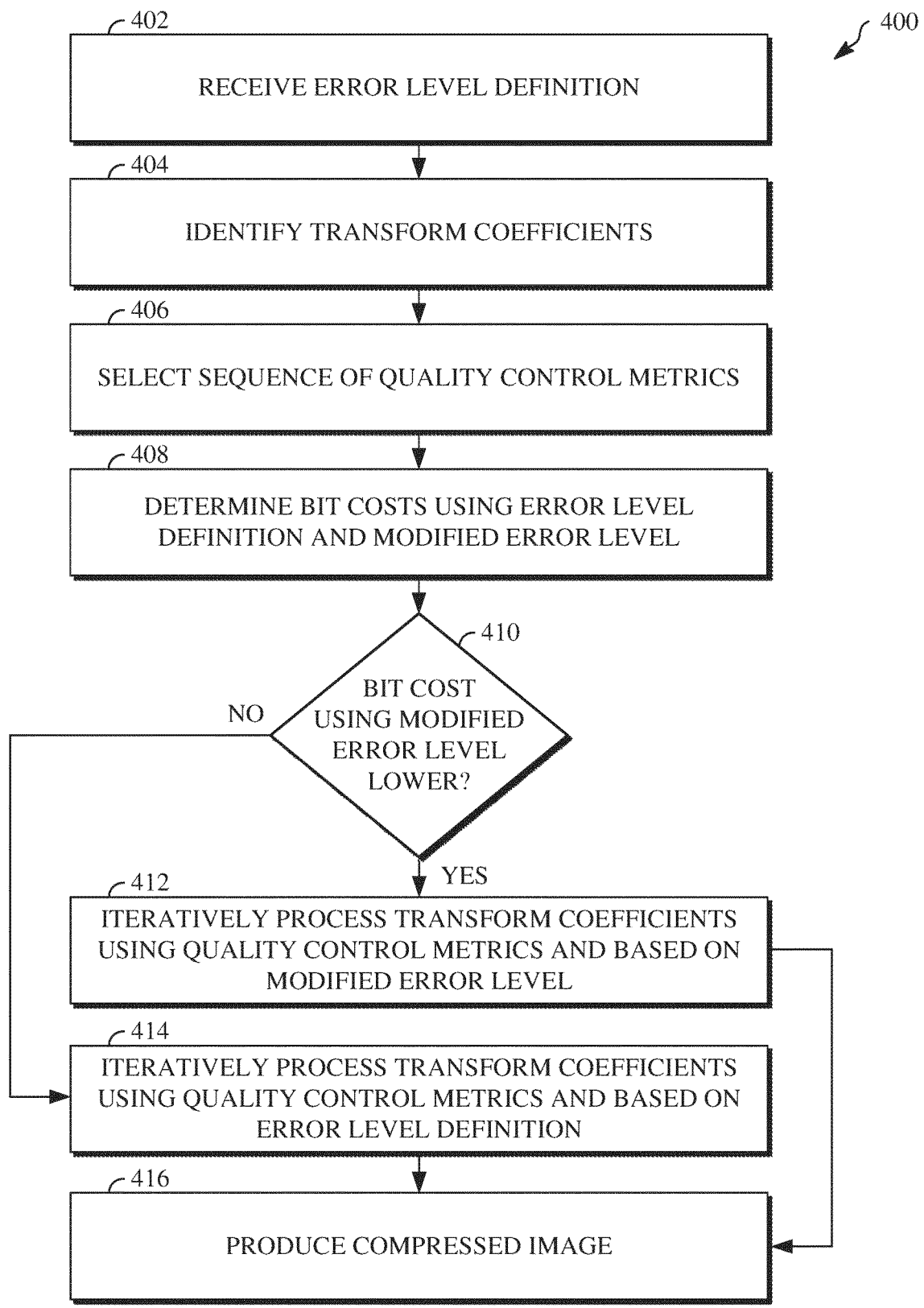
FIG. 4 is a flowchart diagram of an example of a technique for compressing an image according to a selected error level and a sequence of quality control metrics.
Figure 5:
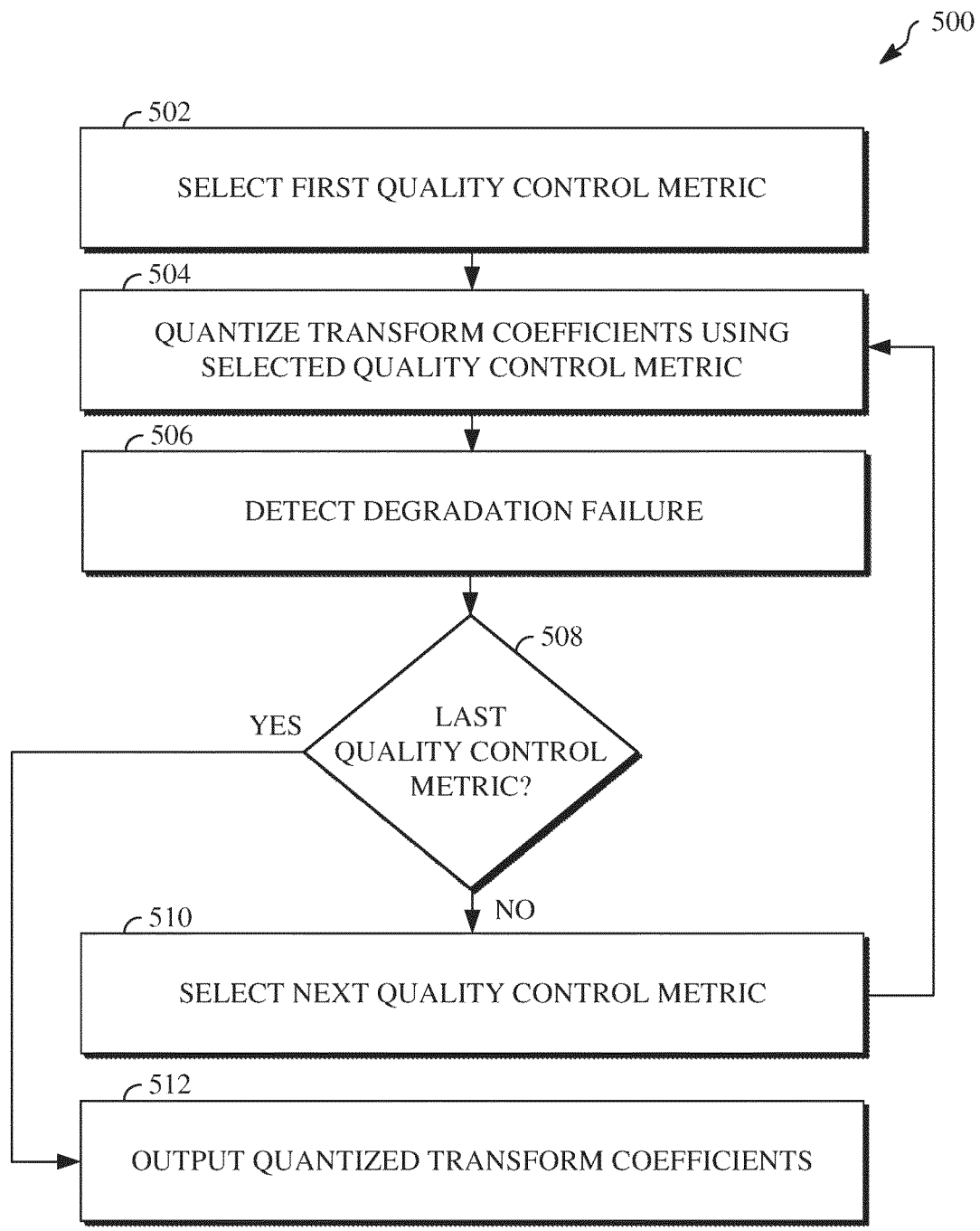
FIG. 5 is a flowchart diagram of an example of a technique for iteratively processing an image using a sequence of quality control metrics.

Techniques for image compression and decompression using controlled quality loss are now described with respect to FIGS. 4-5. FIG. 4 is a flowchart diagram of an example of a technique 400 for compressing an image according to a selected error level and a sequence of quality control metrics. FIG. 5 is a flowchart diagram of an example of a technique 500 for iteratively processing an image using a sequence of quality control metrics.

One or more of the technique 400 or the technique 500 can be implemented, for example, as a software program that may be executed by computing devices such as the transmitting station 102 or the receiving station 104. For example, the software program can include machine-readable instructions that may be stored in a memory such as the memory 204 or the secondary storage 214, and that, when executed by a processor, such as the processor 202, may cause the computing device to perform one or more of the technique 400 or the technique 500. One or more of the technique 400 or the technique 500 can be implemented using specialized hardware or firmware. As explained above, some computing devices may have multiple memories or processors, and the operations described in one or more of the technique 400 or the technique 500 can be distributed using multiple processors, memories, or both.

For simplicity of explanation, the technique 400 and the technique 500 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 4, a flowchart diagram of an example of the technique 400 for compressing an image according to a selected error level and a sequence of quality control metrics is shown. At 402, an error level definition is received. The error level definition represents a maximum quantization error for compressing an image. Receiving the error level definition includes identifying an error level defined for use by the image compressor to use to compress the image.

The error level definition can reflect a default configuration of the image compressor. For example, the error level definition may reflect a static value used against an image to compress. In another example, the error level definition can reflect a value identified based on characteristics of the image to compress (e.g., resolution, color complexity, etc.). Alternatively, the error level definition can reflect a value configured based on input received from a user. For example, a user of a computing device from which an image is uploaded to a server for compression can define the error level to use to compress the image.

At 404, transform coefficients to quantize are identified within an area of the image. As stated above with respect to FIG. 3, an area of an image refers to an M×N-sized region (e.g., one or more blocks) of the image, where M and N may be the same or a different value. The transform coefficients are coefficients processed using a block-based transform (e.g., DCT).

At 406, a sequence of quality control metrics for controlling a quantization of the transform coefficients is selected. The sequence of quality control metrics includes one or more quality control metrics usable to iteratively process the identified transform coefficients, such as to degrade the image content therefrom by quantizing the transform coefficients according to different error levels.

The quality control metrics included in the sequence of quality control metrics are selected based on the error level definition. For example, each of the quality control metrics may be associated with an error level value or value range indicating the error levels for which that quality control metric is useful for degrading image content. A lookup table can be used to store records corresponding to the quality control metrics available for selection. Selecting a quality control metric may thus include querying the lookup table based on the error level definition. In response to the query, quality control metrics having error level values equal to or within a range of the error level definition are selected. Similarly, the querying can be performed to determine that a subset of the quality control metrics is associated with error levels exceeding the error level definition. Some or all of the quality control metrics of that subset may thus be excluded from the sequence of quality control metrics.

Alternatively, the quality control metrics can be selected based on characteristics of the image or of the identified transform coefficients. For example, each of the quality control metrics may be associated with a particular color scale, frequency value range, resolution, or other image characteristic at which that quality control metric is useful for degrading image content. Records corresponding to the quality control metrics within a lookup table can indicate which of the quality control metrics are usable or effective for various image characteristics.

In cases where multiple quality control metrics are selected, candidate quality scores are determined for each of the multiple quality control metrics. A candidate quality score reflects a loss in quality that would result from quantizing the transform coefficients within an area of the image according to a given quality control metric. The candidate quality score for a given quality control metric is determined by quantizing the transform coefficients according to a quantization matrix associated with the quality control metric until the resulting quantization error meets the error level definition. The quantized transform coefficients are then reconstructed to produce a decompressed image.

The quality of the decompressed image is then compared to the quality of the original image using a model of the quality control metric. The results of the comparison are indicated as the quality score for the quality control metric. For example, the quality score can be calculated based on pixel-by-pixel differences between the decompressed image and the original image. In another example, the quality score can be calculated based on the number or amount of artifacts resulting from the quantization.

After the quality control metrics to include in the sequence are selected, they may be ordered according to the image content that will be affected by their use. An image compressor processing the image can be trained to recognize the types of image content that are reduced, removed, or otherwise modified by certain quality control metrics. The order may be based on aspects of the image content that cannot be perceived by human vision (e.g., high frequency blue color data). Such quality control metrics may be arranged earlier in the sequence of quality control metrics.

A psychovisual model (e.g., of the psychovisual model mechanism 314 shown in FIG. 3) can be used to determine the order for the sequence. The psychovisual model can, for example, indicate to arrange quality control metrics that result in little to no perceptible image content loss earlier in the sequence. For example, the psychovisual model can indicate that a first quality control metric for reducing high frequency texture data may be arranged in the sequence of operations before a second quality control metric for reducing low frequency texture data. This may, for example, be because reductions in low frequency texture data are more noticeable to a human observer.

At 408, bit costs for compressing the area of the image are determined according to the error level definition and according to a modified error level. For example, a first bit cost can be determined according to the error level definition and the sequence of quality control metrics, and a second bit cost can be determined according to the modified error level and the sequence of quality control metrics. The modified error level represents a value of a quantization error that is different from the value of the error level definition. In particular, the modified error level represents a quantization error that, if used instead of the error level definition, would result in a potentially different image quality and bit cost for compressing the image.

For example, the modified error level can be a few decimal points above or below the error level definition (e.g., where the error level definition is 1.3, the modified error level can be 1.4). In another example, the modified error level can be a whole number or more in difference from the error level definition. Determining the bit costs includes determining a first bit cost for compressing a first copy of the identified transform coefficients according to the error level definition and the selected sequence of quality control metrics. Determining the bit costs also includes determining a second bit cost for compressing a second copy the identified transform coefficients according to the modified error level and the selected sequence of quality control metrics. The first and second copies of the transform coefficients may represent duplicated data of the identified transform coefficients such that determining the bit costs does not change the identified transform coefficients themselves. Alternatively, the values of the identified transform coefficients may be changed and reset as part of determining the bit costs.

At 410, a determination is made as to whether the second bit cost is lower than the first bit cost. Determining whether the second bit cost is lower than the first bit cost includes comparing the second bit cost to the first bit cost. Responsive to a determination that the second bit cost is lower than the first bit cost, the technique 400 proceeds to 412, where the identified transform coefficients are iteratively processed according to the modified error level and the selected sequence of quality control metrics to produce first quantized transform coefficients.

Responsive to a determination that the second bit cost is not lower than the first bit cost, the technique 400 proceeds to 414, where the identified transform coefficients are iteratively processed according to error level definition and the selected sequence of quality control metrics to produce second quantized transform coefficients. Implementations and examples for iteratively processing an area of an image using quality control metrics are described below with respect to FIG. 5.

At 416, a compressed image is produced based on the first quantized transform coefficients or the second quantized transform coefficients. Producing the compressed image can include entropy processing or otherwise finalizing compression of the first quantized transform coefficients or the second quantized transform coefficients (as applicable) and then outputting them to a digital file. Alternatively, producing the compressed image can include storing the first quantized transform coefficients or the second quantized transform coefficients (as applicable) within a buffer for later processing.

In some implementations, the technique 400 can include identifying a maximum data size value and constraining the compression of the input image based thereon. For example, the maximum data size value can represent a maximum file size of the compressed image (e.g., 150 kilobytes). The maximum data size value can be received as input from a user causing a performance of the technique 400, set by default (e.g., as a default configuration of software used to perform the technique 400), or determined based on characteristics of the input image (e.g., the size or contents thereof). The maximum data size value can be used to control the value of the error level definition, the modified error level, or both.

In some implementations, selecting the sequence of quality control metrics can include comparing expected bit reductions from using various combinations and sequences of quality control metrics to degrade the image content within the identified area of the image. For example, there may be N candidates evaluated, where each candidate includes M quality control metrics in a given order of performance.

In another example, the M quality control metrics in a given candidate sequence may be ordered based on the particular type of image content it degrades. A quality control metric for removing high frequency blue color data from the area of the image may be arranged earlier in a candidate sequence than a quality control metric for augmenting quantization using noise synthesis. The candidate sequence that would result in a greatest expected bit reduction can be selected as the sequence to use to iteratively process the transform coefficients identified within the area of the image.

In some implementations, the modified error level may reflect a value selected from a range of possible modified error levels. For example, the modified error level may reflect a value that is 0.1 greater or less than a value of the error level definition. Multiple candidate modified error levels can be evaluated, such as by determining bit costs for each of those candidates. The candidate associated with the lowest one of those bit costs can then be selected as the modified error level.

In some implementations, the modified error level may be the same value or range of values for processing each area of the image. In some implementations, each area of the image may be processed using different values or ranges of values as the modified error level.

In some implementations, the technique 400 can be performed for multiple areas of the image to compress. For example, transform coefficients identified within a second area of the image can be compressed using the same sequence of quality control metrics as was selected for the transform coefficients of the first area. In another example, transform coefficients identified within a second area of the image can be compressed using a sequence of quality control metrics different from the one selected for the transform coefficients of the first area.

In some implementations, the technique 400 may omit the operations for determining whether the use of the error level definition or the modified error level results in a lower bit cost for compressing the identified transform coefficients. For example, the technique 400 may include operations for compressing an image by selecting a sequence of quality control metrics for compressing transform coefficients and then using the selected sequence to iteratively quantize the transform coefficients.

In some implementations, the technique 400 may omit the operations for selecting the sequence of quality control metrics. For example, the technique 400 may include operations for using a provided (e.g., by default or according to a configuration) sequence of quality control metrics to determine whether the use of an error level definition or a modified error level results in a lower bit cost for compressing the identified transform coefficients.

Referring next to FIG. 5, a flowchart diagram of an example of the technique 500 for iteratively processing an image using a sequence of quality control metrics is shown. At 502, a first quality control metric is selected. The first quality control metric is the first in a sequence of quality control metrics selected for iteratively processing an identified area of an image to compress.

At 504, transform coefficients identified within the area of the image to compress are quantized using the first quality control metric. Quantizing those transform coefficients using the first quality control metric includes degrading the image content represented by those transform coefficients based on the model of the first quality control metric. For example, where the first quality control metric is a quality control metric for removing high frequency blue color data from the area of the image, the first quality control metric is processed against the transform coefficients to remove high frequency blue color data therefrom. In another example, where the first quality control metric is a cartoon image quality control metric, the transform coefficients are processed to remove fine detail but retain edges.

At 506, a degradation failure is detected with respect to the selected quality control metric. A new quality control metric replaces a current quality control metric when the current quality control metric begins to fail. A current quality control metric begins to fail when a quantization error resulting from processing transform coefficients using that current quality control metric exceeds a quality score calibration associated with that current quality control metric. For example, when the quantization error resulting from the use of the current quality control metric is two or more times larger than a quality score for which that quality control metric is calibrated, the current quality control metric is deemed to have failed. In such a case, a next quality control metric according to the sequence of operations is selected to replace the current quality control metric.

At 508, a determination is made as to whether the selected quality control metric is a last quality control metric in a sequence of quality control metrics selected for compressing the area of the image. Responsive to a determination that the selected quality control metric is not a last quality control metric, at 510, a next quality control metric is selected. The technique 500 then returns to 504, where the identified transform coefficients are processed using the newly selected quality control metric. Upon a degradation failure of the newly selected quality control metric being detected, another determination is made as to whether that newly selected quality control metric is a last quality control metric in the sequence. The technique 500 repeats accordingly until a then-currently selected quality control metric is the last in the sequence.

Responsive to a determination that the selected quality control metric is a last quality control metric, at 512, the processed area of the image is output. The resulting quantized transform coefficients are output to another part of an image compressor that performs the technique 500, such as to prepare the processed area for compression.

In some implementations, the technique 500 can be performed to determine a sequence of quality control metrics to use to iteratively process the area of the image. For example, multiple candidate sequences can be individually evaluated using the technique 500 by processing each of the quality control metrics thereof against a given area of an image to compress. As a result of evaluating such a candidate sequence, a total bit reduction can be determined for that candidate sequence as the output of the technique 500.

Figure 6:
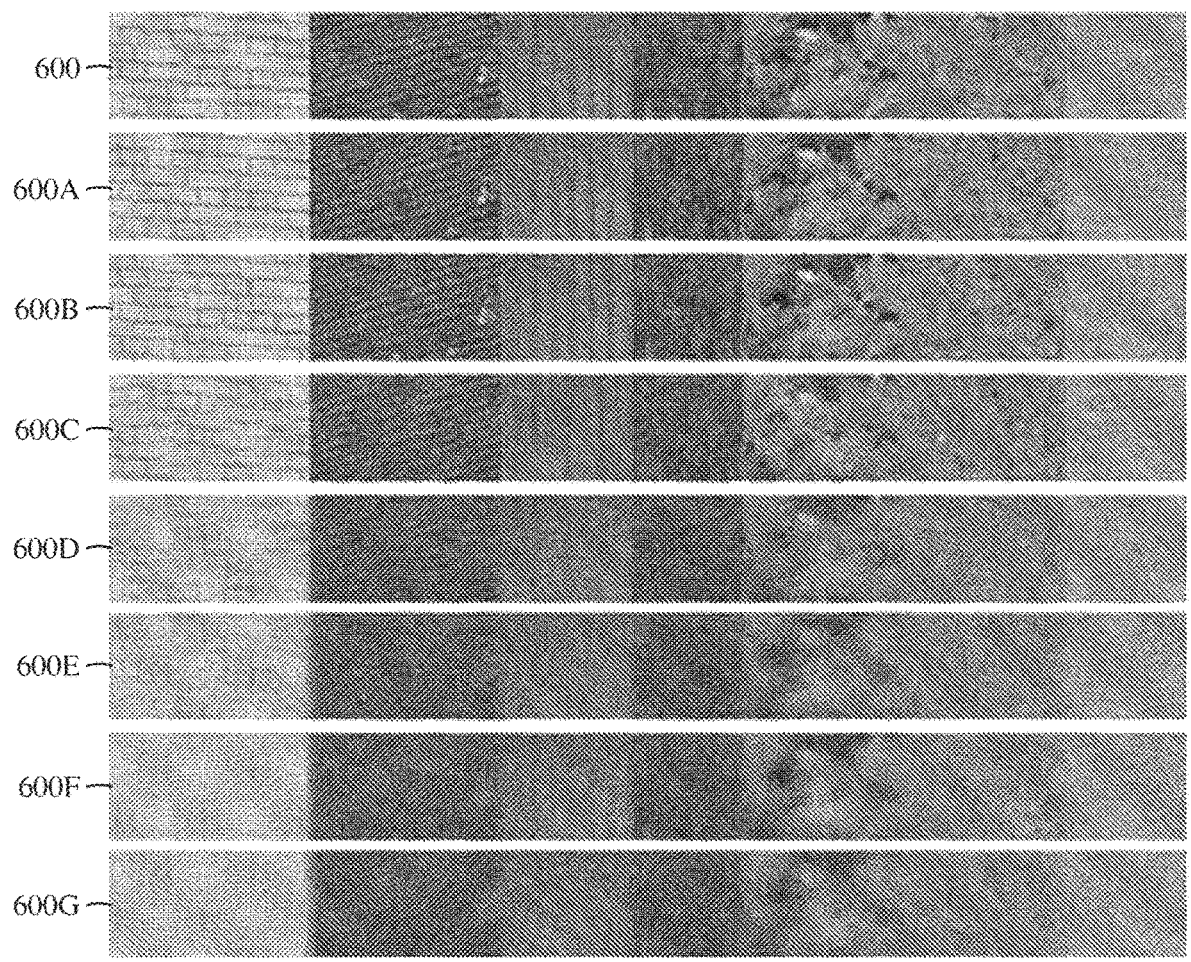
FIG. 6 is an illustration of areas of an image iteratively processed using a sequence of quality control metrics.

FIG. 6 is an illustration of areas of an image 600 iteratively processed using a sequence of quality control metrics. The image 600 may, for example, be the input image 304 shown in FIG. 3. The image 600 may be iteratively processed using one or more quality control metrics. A first quality control metric is processed against the image 600 to produce an image 600A. The image 600A has the same textures as the image 600, but with the high frequency blue-yellow axis removed (e.g., with a sigma of five pixels). This may be a typical first information removal when processing an image, as the fovea does not have blue receptors.

A second quality control metric is processed against the image 600A to produce an image 600B. The image 600B represents the image 600A after red-green high frequency information is removed (e.g., with a sigma of five pixels). A third quality control metric is processed against the image 600B to produce an image 600C. The image 600C represents the image 600B after the textures are reconstructed using phase and frequency quantization (e.g., to make the textures more approximate). A fourth quality control metric is processed against the image 600C to produce an image 600D. The image 600D represents the image 600C after more quantization is applied, which more quantization may be augmented with noise synthesis.

A fifth quality control metric is processed against the image 600D to produce an image 600E. The image 600E represents the image 600D after further high frequency information is removed and after the image is processed based purely on noise synthesis. The images 600F and 600G represent further sequentially-produced images resulting from a total removal of high frequency information. The image 600G thus represents a reconstructed image produced responsive to processing an original image (e.g., the image 600) using multiple quality control metrics. The quantized transform coefficients of the image 600G may be compressed and output for transmission.

In some implementations, different error levels can be used to quantize the different areas of the image 600 (or subsequently-produced images 600A-G). For example, an error level definition (e.g., 1.3) can be defined for the entirety of the image 600. However, an image compressor processing the image 600 can instead use a modified error level (e.g., 1.4) upon determining that the modified error level will result in a greater bit savings (e.g., a lower bit cost) for compressing the subject area. For example, the white brick texture in the leftmost area of the image 600 may be compressed at the error level definition, while the area with the leafy green texture towards the right side of the image 600 may be compressed at a modified error level.

The aspects of compression and decompression described above illustrate some examples of compression and decompression techniques and hardware components configured to perform all or a portion of those examples of compression and/or decompression techniques. However, it is to be understood that compression and decompression, as those terms are used in the claims, could mean encoding, decoding, transforming, or another processing or changing of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

All or a portion of the implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for compressing an image, the apparatus comprising:
    a memory; and
    a processor, wherein the processor is configured to execute instructions stored in the memory to:
    receive an error level definition representing a maximum quantization error for compressing the image;
    select, based on the error level definition, a sequence of quality control metrics for controlling a quantization of transform coefficients of the image;
    compress the image according to the error level definition and the sequence of quality control metrics, wherein the instructions to compress the image according to the error level definition and the sequence of quality control metrics include instructions to:
        quantize the transform coefficients using a first quality control metric of the sequence of quality control metrics;
        determine that a quantization error resulting from quantizing the transform coefficients using the first quality control metric exceeds a quality score calibration associated with the first quality control metric;
        responsive to a determination that the quantization error exceeds the quality score calibration, further quantize the transform coefficients using a second quality control metric of the sequence of quality control metrics to produce quantized transform coefficients; and
        produce a compressed image based on the quantized transform coefficients; and
    output the compressed image for storage or display.

2. The apparatus of claim 1, wherein the instructions include instructions to:
    determine a first candidate bit cost by quantizing a first copy of the transform coefficients according to the error level definition and the sequence of quality control metrics;
    determine a second candidate bit cost by quantizing a second copy of the transform coefficients according to a modified error level and the sequence of quality control metrics; and
    determine, based on the first candidate bit and the second candidate bit cost, to compress the image according to one of the error level definition or the modified error level.

3. The apparatus of claim 2, wherein the instructions to determine to compress the image according to one of the error level definition or the modified error level include instructions to determine whether the second candidate bit cost is lower than the first candidate bit cost, and wherein the instructions include instructions to:
    responsive to a determination that the second candidate bit cost is lower than the first candidate bit cost, compress the image according to the modified error level and the sequence of quality control metrics, and
    responsive to a determination that the second candidate bit cost is not lower than the first candidate bit cost, compress the image according to the error level definition and the sequence of quality control metrics.

4. The apparatus of claim 3, wherein the quantized transform coefficients are first quantized transform coefficients and the quantization error is a first quantization error, wherein the modified error level corresponds to an area of the image, wherein the instructions to compress the image according to the modified error level and the sequence of quality control metrics include instructions to:
    quantize a subset of the transform coefficients using the first quality control metric of the sequence of quality control metrics, wherein the subset of the transform coefficients is located within an area of the image;
    determine that a second quantization error resulting from quantizing the subset of the transform coefficients using the first quality control metric exceeds the quality score calibration associated with the first quality control metric;
    responsive to a determination that the second quantization error exceeds the quality score calibration, further quantize the transform coefficients using the second quality control metric of the sequence of quality control metrics to produce second quantized transform coefficients; and
    produce a compressed image based on the second quantized transform coefficients.

5. The apparatus of claim 4, wherein a quantization error represented by the modified error level is larger than the maximum quantization error.

6. The apparatus of claim 2, wherein the modified error level is a first modified error level, wherein the second copy of the transform coefficients corresponds to a first subset of the transform coefficients located within a first area of the image, wherein the instructions include instructions to:
    determine a third candidate bit cost by quantizing a second subset of the transform coefficients located within a second area of the image according to a second modified error level and the sequence of quality control metrics, wherein the instructions to compress the image according to the error level definition and the sequence of quality control metrics include instructions to:
  compress the first subset of the transform coefficients according to the first modified error level; and
  compress the second subset of the transform coefficients according to the second modified error level.

7. The apparatus of claim 1, wherein the instructions to select the sequence of quality control metrics for controlling the quantization of the transform coefficients of the image include instructions to:
  determine that a subset of quality control metrics available for compressing the image is associated with error levels exceeding the error level definition; and
  exclude one or more quality control metrics of the subset of the quality control metrics from the sequence of quality control metrics.

8. A method for compressing an image, the method comprising:
  receiving an error level definition representing a maximum quantization error for compressing the image;
  selecting, based on the error level definition, a sequence of quality control metrics for controlling a quantization of transform coefficients of the image;
  compressing the image according to the error level definition and the sequence of quality control metrics by:
    quantizing the transform coefficients using a first quality control metric of the sequence of quality control metrics;
    determining that a quantization error resulting from quantizing the transform coefficients using the first quality control metric exceeds a quality score calibration associated with the first quality control metric;
    responsive to determining that the quantization error exceeds the quality score calibration, further quantizing the transform coefficients using a second quality control metric of the sequence of quality control metrics to produce quantized transform coefficients; and
    producing a compressed image based on the quantized transform coefficients; and
  outputting the compressed image for storage or display.

9. The method of claim 8, wherein the transform coefficients correspond to a first area of the image and the sequence of quality control metrics is a first sequence of quality control metrics, the method comprising:
  iteratively processing transform coefficients of a second area of the image using a second sequence of quality control metrics.

10. The method of claim 9, wherein iteratively processing the transform coefficients of the second area of the image using the second sequence of quality control metrics comprises:
  determining a candidate bit cost by quantizing the transform coefficients of the second area of the image according to a modified error level and the second sequence of quality control metrics.

11. The method of claim 8, wherein selecting the sequence of quality control metrics for controlling the quantization of the transform coefficients comprises:
  querying a lookup table based on the error level definition.

12. The method of claim 11, wherein the lookup table includes records associated with multiple quality control metrics, wherein selecting the sequence of quality control metrics for controlling the quantization of the transform coefficients comprises:

determining that a subset of the multiple quality control metrics is associated with error levels exceeding the error level definition; and
  excluding one or more quality control metrics of the subset of the multiple quality control metrics from the sequence of quality control metrics.

13. The method of claim 8, wherein the transform coefficients are quantized and further quantized according to the error level definition based on a first candidate bit cost determined according to the error level definition being lower than a second candidate bit cost determined according to a modified error level.

14. The method of claim 13, wherein a quantization error represented by the modified error level is larger than the maximum quantization error.

15. A non-transitory computer-readable storage medium comprising processor-executable routines that, when executed by a processor, facilitate a performance of operations for compressing an image, the operations comprising:
  selecting, based on an error level definition representing a maximum quantization error for compressing the image, a sequence of quality control metrics for controlling a quantization of transform coefficients of the image;
  compressing the image according to the error level definition and the sequence of quality control metrics by:
    quantizing the transform coefficients using a first quality control metric of the sequence of quality control metrics;
    determining that a quantization error resulting from quantizing the transform coefficients using the first quality control metric exceeds a quality score calibration associated with the first quality control metric;
    responsive to determining that the quantization error exceeds the quality score calibration, further quantizing the transform coefficients using a second quality control metric of the sequence of quality control metrics to produce quantized transform coefficients; and
    producing a compressed image based on the quantized transform coefficients; and
  outputting the compressed image for storage or display.

16. The non-transitory computer-readable storage medium of claim 15, wherein the sequence of quality control metrics defines an order for applying one or more quality control metrics to iteratively quantize some or all of the transform coefficients of the image.

17. The non-transitory computer-readable storage medium of claim 15, wherein the operations for selecting the sequence of quality control metrics for controlling the quantization of the transform coefficients of the image comprise:
  determining that a subset of quality control metrics available for compressing the image is associated with error levels exceeding the error level definition; and
  excluding one or more quality control metrics of the subset of the quality control metrics from the sequence of quality control metrics.

18. The non-transitory computer-readable storage medium of claim 15, the operations comprising:
  determining to compress the image according to the error level definition based on a first bit cost determined according to the error level definition being lower than a second bit cost determined according to a modified error level.

19. The non-transitory computer-readable storage medium of claim 15, the operations comprising:
   determining to compress the image according to a modified error level based on a first bit cost determined according to the error level definition being higher than a second bit cost determined according to the modified error level.

20. The non-transitory computer-readable storage medium of claim 19, wherein a quantization error represented by the modified error level is larger than the maximum quantization error.

\* \* \* \* \*